(12) United States Patent
Beauregard et al.

(10) Patent No.: US 8,155,276 B2
(45) Date of Patent: Apr. 10, 2012

(54) SYNCHRONOUS AND ASYNCHRONOUS BROKERING OF IVR SESSIONS FOR OFFLINE INTERACTION AND RESPONSE

(75) Inventors: Derek Beauregard, Denver, CO (US); Vivek Bhatnagar, Federal Heights, CO (US)

(73) Assignee: Avaya Inc., Basking Ridge, NJ (US)

( * ) Notice: Subject to any disclaimer, the term of this patent is extended or adjusted under 35 U.S.C. 154(b) by 435 days.

(21) Appl. No.: 12/434,284

(22) Filed: May 1, 2009

(65) Prior Publication Data

US 2010/0278316 A1 Nov. 4, 2010

(51) Int. Cl.
*H04M 1/64* (2006.01)
(52) U.S. Cl. ..................................... 379/74; 379/201.02
(58) Field of Classification Search ............... 379/10.03, 379/1.02, 74, 77, 201.01, 201.02
See application file for complete search history.

(56) References Cited

U.S. PATENT DOCUMENTS

| | | | | |
|---|---|---|---|---|
| 4,935,954 A | * | 6/1990 | Thompson et al. | 379/88.04 |
| 5,822,405 A | * | 10/1998 | Astarabadi | 379/88.04 |
| 6,229,880 B1 | * | 5/2001 | Reformato et al. | 379/88.01 |
| 6,870,910 B1 | | 3/2005 | Armstrong et al. | |
| 7,065,188 B1 | | 6/2006 | Mei et al. | |
| 2010/0002850 A1 | * | 1/2010 | Jaiswal et al. | 379/88.04 |

OTHER PUBLICATIONS

Nusca, et al.; "Weekend Gadget Guidance: Navigate Phone Trees Automatically"; The ToyBox; Aug. 1, 2008; 1 pg.

* cited by examiner

*Primary Examiner* — Olisa Anwah
(74) *Attorney, Agent, or Firm* — Sheridan Ross P.C.

(57) ABSTRACT

An IVR session brokering service provides as one core mechanism, a pool of intelligent software agents residing on a cluster-able software services platform. These agents could be designed to act as stateful and customized interaction brokers for interacting automatically and semi-automatically with existing IVR systems. Customers and users would use this brokering service as an IVR normalization and aggregation mechanism for centralizing and personalizing their user experience with a full range of IVR systems that are of interest to them. The service could consume, operate on and transform voice and touchtone communication information that is transmitted between IVR systems and the end-user customers that are currently using those IVR systems.

20 Claims, 5 Drawing Sheets

SYNCHRONOUS AND ASYNCHRONOUS BROKERING OF IVR SESSIONS FOR OFFLINE INTERACTION AND RESPONSE

FIELD OF THE INVENTION

One exemplary aspect of the present invention is directed toward communications, and more specifically toward interactions with interactive voice response systems ("IVRs"). Even more particularly, one exemplary aspect is directed toward providing an IVR agent that acts as an intermediary between a user and one or more IVR systems.

BACKGROUND OF THE INVENTION

As recently as 20 years ago, this problem did not exist. IVR systems did not exist as deployed business tools. Many large businesses historically have used, and continue to use, call centers with agents trained to service customer calls. Small businesses generally assign a receptionist to answer incoming business telephone calls from customers who deal with each customer in a highly personal fashion.

The currently available interactive voice response systems are scalable, highly reliable and rich in features. Despite this level of technological maturity, IVRs are generally viewed, by virtually every IVR user, as being extremely painful and frustrating to use. No matter how extensively an IVR has been designed in an effort to achieve ease of use, the IVR solution designer rapidly hits a wall of diminishing returns where more features or menu depth results in rapid decreases in usability. Furthermore, existing IVR systems are very heterogeneous with many different looks and feels, voices, features, etc.

This situation emerges as a result of the classic 80/20 rule. IVRs are designed to serve the needs of the 80% average user performing tasks that are considered 80% standard tasks. As a result, for any given specific IVR session, 80% of the IVR users will be able to successfully navigate a corporate IVR system to successfully complete an 80% standard task. This leaves 20% of users who don't fit the average user profile. Inclusion in the non-standard 20% may result either from the users limited ability or familiarity with IVR usage, or it may result from the non-standard nature of the task they need to complete using the IVR. Over the course of many sessions with various and varying IVRs, it is a mathematical certainty that 100% of the user population will, fall into the 20% category of people who have had a bad experience with an IVR. Whether this results from a lack of skill in navigating IVRs, a poor IVR menu system, bad speech recognition capabilities or simply a poorly executed IVR architecture, all users eventually end up having had multiple bad IVR interaction experiences.

Even if the percentage numbers for successful vs. unsuccessful interactions is 95/5, the same result is produced again given enough time. Therefore, today's IVR systems, as they are currently architected and implemented in common practice, will never achieve high levels of overall customer satisfaction from users.

SUMMARY OF THE INVENTION

One exemplary aspect of the present invention provides a solution to this dilemma by specifically focusing on addressing the lack of personalization inherent in today's 80/20 approach to designing and implementing IVRs. In accordance with one exemplary aspect, personalized and customized IVR interactions are managed that are unique to each user and can dramatically improve the overall satisfaction level with that user's experience.

Another aspect of the present invention provides an IVR session brokering service, implementing as its core mechanism, a pool of intelligent software agents residing on a cluster-able software services platform. These agents could be designed to act as stateful and customized interaction brokers for interacting automatically and semi-automatically with existing IVR systems. Customers and users would use this brokering service invention as an IVR aggregation mechanism for centralizing and personalizing their user experience with a full range of IVR systems that are of interest to them. The service could consume, operate on and transform voice and touchtone communication information that is transmitted between IVR systems and the end-user customers that are currently using those IVR systems.

The IVR brokering service has proxy agents that would effectively normalize the IVR experience for each user by reformatting and refactoring the various IVR systems of interest to present a modified user experience that matches the user's preferred IVR interaction model. Each user's preferred interaction model could be defined and implemented by referencing individual preferences as defined in their personal profile. This profile would grow and morph through ongoing interaction with the user and adaptively learn through the use of the brokering services intelligent software agents. Artificial intelligence, coupled with the ability to utilize expert systems and neural networking could also assist in ensuring a more optimal user experience.

Included in this profile, as a base, would be all the business service numbers each subscriber might use in contacting businesses they patronize for various products and services. These businesses could include such things as health insurance, car insurance, bank, financial advisor, 401K, technical support, and the like. Also included in the profile would be all the key personal information that might be needed to be provided by the user during interactions with any of the business service IVRs. This information includes such things as social security number, policy numbers, date of birth, dependent information, employment status, qualifying event information, account numbers, balance information, etc. The key personal information about the user could automatically or semi-automatically be filled in by the IVR broker when requested by an IVR system. For example, the user could press a preset key combination to have the broker supply an account number, or the broker could detect the type of information the IVR is requesting and automatically supply it to the IVR system.

Users of exemplary embodiments would be freed from having to call in separately to a variety of independent IVR telephone numbers. Instead, users would always call into a single telephone number associated with the IVR brokering service. The service would, as an initial interaction feature, provide the users with a secure, independent multi-IVR single-sign-on mechanism. This mechanism would allow a user to authenticate once to the brokering service and proceed to perform multiple IVR interactions with completely independent IVR systems without having to re-authenticate to each IVR system.

Once authenticated to the IVR brokering service, the user would be presented with a custom voice/DTMF menu driving a personalized IVR aggregation portal. In an exemplary embodiment, the portal interface would have both a Telephone UI (TUI) and a Web UI (WUI) and the ability to use both telephone and web simultaneously in the use of the service. The portal would allow users then to interact with an unbounded list of business services IVRs from a single top-level menu implemented by the IVR aggregation service. One significant advantage to this type of construct is the ability for the brokering service software agents to automatically navigate and interact with all, or portions, of existing IVR menu systems acting on behalf of the user. Another benefit is that the IVR agent/broker can provide ASR or speech recognition services to the human user even if none of the multiple IVR's the IVR agent/broker is interacting with could have been able to have provided ASR or speech recognition services.

These types of functions would allow the system to perform many of the routine tasks required by IVR systems without having to have the user present at all times on an IVR session, manually executing all of the interactions with that IVR.

As an example, if a user decides they need to interact with the separate business services IVRs, from three independent companies they have relationships with, they would log into the IVR brokering service and select the three companies that they will be interacting with. Once selected the user would initiate a multi-IVR interaction session wherein the user could interact either in a serial fashion with these IVRs or, in a facilitated parallel fashion.

In the serial mode, a user would be guided by the agent through start to finish interactions with each IVR before proceeding to the next. During these sessions, the interaction menus would be modified by the service to meet the preferred and custom modes of interaction with the user. Additionally, the service would throughout each session be able to provide back to the third party IVR system, a variety of pieces of voice and/or touchtone information. This provides value in the user not having to repeatedly provide the information themselves each time.

In order to enhance the exchange of the various types of information handled by the agent, multiple communication channels could be opened in parallel between the IVR agent and each respective IVR. This would allow, for example, the parallel operation of information channels associated with a session, such as the parallel communication paths associated with a TUI (Telephone User Interface) and a WUI (Web User Interface).

In parallel mode, the brokering service agent may facilitate the user in interacting with all of the IVRs at the same time. For example, while the brokering service is waiting on hold with one IVR system for the user, another software agent could be interactively and automatically navigating through the menus for a second IVR. The agent for the second session might even complete a task fully without continuous user involvement, while also guiding the user on a third IVR session. The brokering service agent would know a priory, based on prior understanding of each IVR system the user may be interacting with, whether the user can do a parallel session with multiple IVRs or if a serial session model is required.

IVR systems today are largely constructed using voice XML (VXML) technology. The structure, events and functional elements of IVRs are represented as VXML scripts. These scripts fully describe all the execution paths and outcomes that are possible for a given IVR to produce. Intelligent interaction proxies, as implemented in an exemplary embodiment, would have VXML engines for processing and reformatting the VXML scripts of all the business service IVRs that users of a brokering service have designated as being of interest. In addition to VXML, there are also 'grammar' specifications that define the DTMF and ASR that is used to respond. In an exemplary embodiment of this service, the companies that have been opted-in to the brokering service by customers could proactively provide these VXML scripts (and optionally grammar specifications) to the brokering system so as to improve the overall customer satisfaction and efficiency of their customers in interacting with the IVR system.

In accordance with yet another exemplary aspect of the invention that is enabled via the construction of systems that implement the ideas herein is the ability for users to interact with an IVR in a non-real-time and asynchronous fashion. Currently, to operate an IVR system, a user must engage in a real-time and synchronous interaction session with an IVR system, wherein a series of synchronous request/response exchanges take place. In accordance with an exemplary embodiment, the a priori modeling and knowledge by the system, of both the details of any given IVR system and the data and preferences of a user of the system, allow for the system to coordinate a non-real-time and asynchronous "virtual" interaction between a user of the system and any given IVR. Furthermore, the system could also allow for either the company that owns an IVR to initiate/request a non-real-time session to interact with a given user, or vise versa, for the user to request a non-real-time interaction with the corporate-owned IVR. For outbound campaigns where the broker service is contacting the user for an asynchronous or synchronous session, the user could specify a time and device they wish to receive the IVR session on, and the broker could execute the cached campaign at that time and on that device. As part of these non-real-time interactions, implementations of this invention could provide for the creation and storage of session instances with complex representations of session state. These session state objects would represent the detailed state of a state machine representing all the data relating to a session as well as the representation of all the state transitions that had been executed throughout the lifetime of a given instance of a session state machine.

For example, a health insurance company that is a certified business user of the brokering service could send an inquiry to the service requesting that a user verify their most recent address and list of dependents on a family health insurance plan. The brokerage service could then do one of several things based on the user's preferences. It could, for example, if the user has enabled this ability, automatically provide the information back to the company without the user having to be brought into the session in any fashion. The service could simply provide the most recent information back to the requesting company and make a note of the transaction for the user that would be seen at a later time. This is similar to how credit reporting companies operate when they provide credit score information to creditors checking a person's credit rating. A non-real-time variation of this scenario would have the intermediary brokering service cache the request as an instance of a session state machine and forward or deliver that session according to the user's settings to the user in a form, and at a date and time at a device, that meets with a user's preferences. The system may also create a batch job of a variety of requests and present them all at once to the user for efficient approval and processing. The user could approve or deny each of the requests by the system, with the system returning the entered information to the requesting entities.

In that some of that information may have changed, the user could update their information so that the service has the latest user information for subsequent automatic use. Once the user processes the entire batch of sessions the user could logout and the brokering service would go back and initiate sessions to the IVR systems and fulfill all the requests the user had processed with the brokering service.

Another example would be if there are multiple IVR systems that have a similar structure or purpose, the user could do this interaction once, and the agent could go out to multiple systems. For example, if shopping for car insurance, a user could asynchronously work with the agent once and the agent could reach out to multiple IVR systems to automate the work.

As a variation of the above, instead of the corporation making requests to the brokering service in a non-real-time fashion, the user may want to make a non-real-time and asynchronous request through the brokering service to an IVR for a corporation. The user would call into, or web into, the brokering service and have an IVR interaction with the brokering service agent in an offline mode. The brokering service would capture the interaction and cache it and then in an automated fashion call into the actual IVR systems later and execute the IVR session without the end user having to be involved actively. This may be useful in situations where, for example, a person has time to do the IVR interaction but the company's actual IVR service center is closed, down, or otherwise not available.

In addition to the standard user interaction modes of voice and DTMF, an exemplary embodiment for the system would have the ability to translate the interactions between a user and the brokering service into a variety of other interaction modes including, text-based interfaces, such as an instant messaging client, AJAX web client, email client and/or a SMS client. Some sessions in fact could be performed using more than one interaction mode with some requests and responses being sent and received using, for example, voice/DTMF, and others being sent using one of the varieties of text modes described above.

In accordance with another exemplary embodiment is the ability for companies to begin using this brokering service as a starting place for implementing an IVR system. The brokering service would evolve to provide an IVR design wizard service that would capture all the specific interaction components that a company requires for interacting effectively with its customers. The wizard would assist with enforcing some level of standards that keeps the user experience consistent.

From the start, any IVR implemented using the service, versus deploying a custom stand alone, would be designed to be customizable to individual consumer preferences. In addition, the design wizard would not allow the specification of custom and unique transitions between interaction components. The company building a new IVR would instead pick from a pre-defined toolbox of transition elements that are common to all IVRs. This would allow a company to, for example, require authentication before allowing a user to change any information, but would constrain the company from designing in custom transitions that actually confuse users by being non-standard. Over time, this would allow companies to rapidly generate and deploy IVR systems that immediately are easy to navigate for all users and that adhere to the IVR best practices that emerge over time from the operation of the IVR interaction ecosystem.

IVR technology and industry is focused on allowing companies to implement a fully custom and stand alone IVR deployed as a premises-based solution. The expense and operational cost of deploying such systems are extremely high. Also, the resulting Tower of Babel problem, wherein every IVR experience is different for users, is frustrating and counter-productive for all involved. In accordance with one exemplary aspect of the present invention, the system is provisioned such that the design creates a repeatable and personalized experience for each user of any IVR system. One exemplary advantage of this system is that it preserves and ultimately enhances the investment companies have already made in current IVR infrastructure.

In accordance with another exemplary embodiment, the system provides the ability to simultaneously normalize and personalize the IVR user experience without requiring companies to scrap or even significantly modify existing IVR systems.

In accordance with yet another exemplary embodiment, the communication types and protocols used between an agent and various IVRs and the user can be any combination, such as voice, speech, web interface, telephone interface, graphical user interface, DTMF, or in general any communication methodology or language that will allow communication between the various entities. Thus, the various IVRs and customer service representatives interacting therewith can be provided with a translation of the various exchanges in a session to facilitate communication and provide the most efficient modality for their particular communications device.

Taking the translation concept a step further, the agent can perform such things as grammar translation, language translation, media translation, and modality translation to facilitate communication between the various entities. Furthermore, a common grammar between IVRs and agents could be standardized to assist with these communications. In addition, IVRs that lack a type of input could be enabled with the translations.

Accordingly, one exemplary aspect of the invention is directed toward communication systems, and more particularly to enhanced IVRs and an IRV agent.

Another exemplary aspect of the invention is directed toward an IVR agent.

Yet another exemplary aspect of the invention is directed toward providing real-time or non-real-time access to one or more IVRs through an IVR agent that is capable of performing automatically, semi-automatically, or on behalf of a user.

Even further aspects of the invention relate to an IVR agent, acting in conjunction with one or more rules, to facilitate data exchange between the agent and one or more IVRs.

Even further aspects of the invention relate to translating communications between one or more of an IVR, IVR agent and user to facilitate communications.

Even further aspects of the invention relate to providing an IVR agent that is capable of automatically responding to one or more IVR queries based on stored information.

Even further aspects of the invention relate to providing an IVR agent that is capable of performing a portion of an IVR interaction session, and saving session state information such that the session can be provided to a user at a later time.

Even further aspects of the invention relate to allowing an IVR agent to forward information such as personal information and saved information to one or more IVRs.

Aspects of the invention are also generally related to IVR wizard design services based on the IVR agent model.

Even further aspects of the invention relate to providing a translation agent that allows enhanced communications between one or more IVR agents, one or more IVRs, and a user, associated with one or more endpoints.

Additional aspects of the invention relate to providing an interface, such as a WUI, GUI and/or TUI, that allows a user to edit, create and manage one or more of personal information, preferences and rules associated with an IVR agent.

Even further aspects of the invention relate to controlling dissemination of information by an IVR agent based on one or more rules.

Additional aspects of the invention relate to customizing an IVR experience based on one or more preferences. These preferences can govern such things as language, interface, user device for the IVR session, volume, time for the session, and in general can control any aspect of an IVR session with one or more IVRs.

Additional aspects of the invention relate to providing an IVR agent with single sign-on (SSO) provisioning that allows automated authentication to one or more IVRs.

Even further aspects of the invention relate to an IVR agent that acts as an intermediary between a user and one or more heterogeneous IVR systems.

Additional aspects of the invention relate to providing a unified look and feel to the end user regardless of the IVR system they are accessing. More specifically, input and output is converted into a grammar and format which the specific IVR supports, as well as translated (or retranslated) in accordance with user preferences. At least DTMF and automatic speech recognition inputs can be supported, in which case, since all IVRs may not support, or support well, user input may need to be translated into the type of grammar and format that a specific IVR is expecting with this translated input submitted to the IVR. Additionally, the various prompts, such as audio prompts, which an IVR is playing, could be converted into a normalized look and feel for the user.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures, wherein.

DETAILED DESCRIPTION

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide IVR interaction. For example, the systems and methods disclosed herein will also work well with SIP-based communications systems and endpoints. Moreover, the various endpoints described herein can be any communications device such as a telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figure 1:
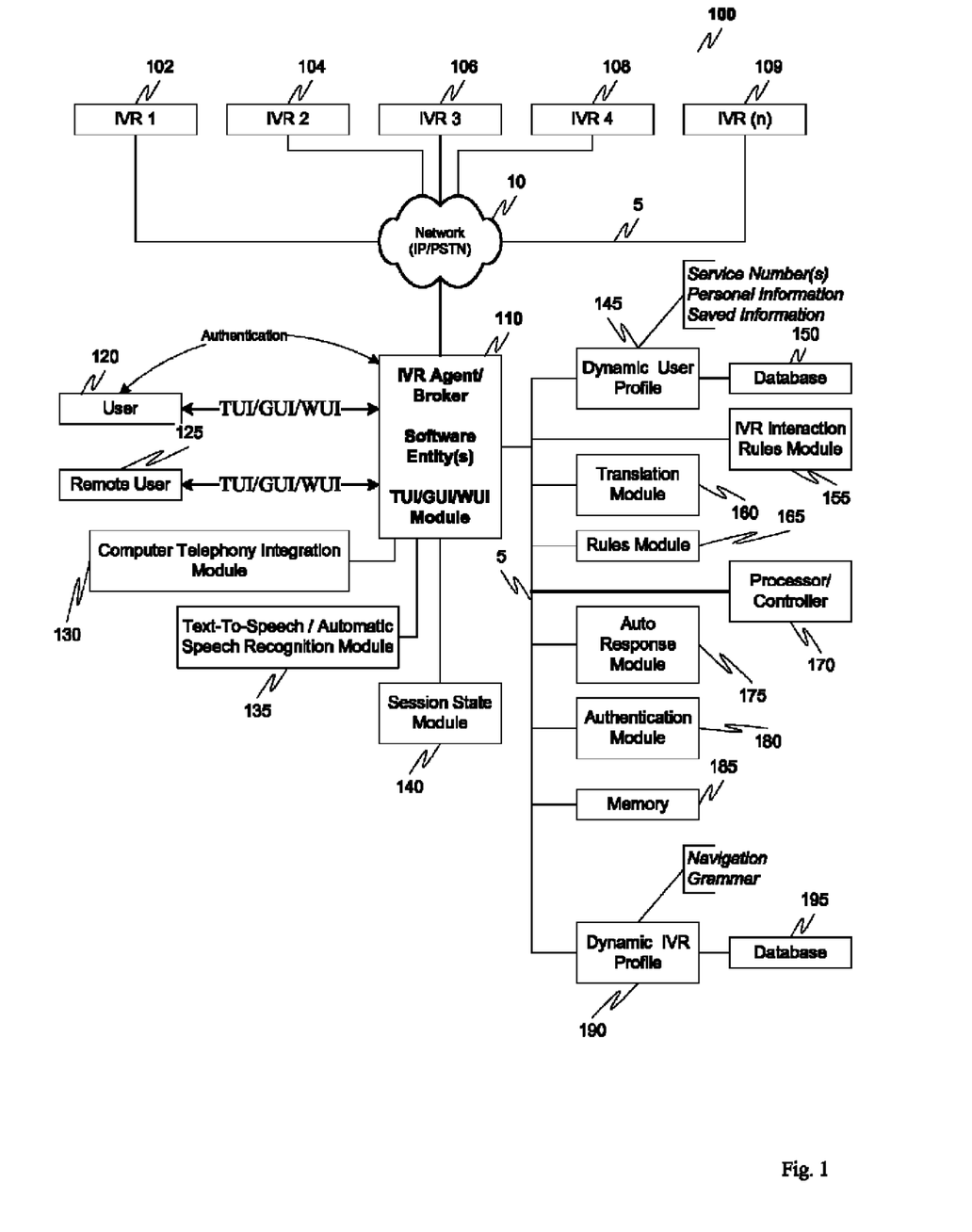
FIG. 1 illustrates an exemplary communications system according to this invention.

FIG. 1 illustrates an exemplary communications system 100 according to this invention. The communications system 100, in addition to conventional components, includes one or more IVRs 102-109, an IVR agent/broker 110, a user 120, a remote user 125, a computer telephony integration (CTI) module 130, a text-to-speech (TTS)/automatic speech recognition (ASR) module 135, a session state module 140, a dynamic user profile 145, database 150, IVR interaction rules module 155, translation module 160, rules module 165, processor 170, auto response module 175, authentication module 180, memory 185, dynamic IVR profile 190 and database 195, all interconnected via one or more links and networks 10.

The text-to-speech (TTS)/automatic speech recognition (ASR) module 135 could also include a general media module (not shown) that can play any type of media to the user or to the IVR systems.

The user 120 interfaces with the IVR agent 110 via an endpoint, such as a computer, communications device, softphone, PDA, cell phone, PSTN phone, or in general, any communication device for which communications can be exchanged via a packet-switched or circuit-switched network. The user 120 is provided with a single sign-on authentication methodology that allows the user 120 to be authenticated to the IVR agent 110. To assist with this authentication, for example, a caller ID, MAC address, or in general any information corresponding to a user device that can be used to specifically identify an endpoint associated with the user can be used in conjunction with the single sign-on authentication. The user 120 is then capable of interacting with the IVR agent 110 via one or more or a TUI, GUI and WUI.

In a similar manner, single sign-on authentication can be provided to remote user 125, such as when a user is traveling and not using their normal communications device for which they normally use to interact with the IVR agent 110. In these instances, additional authentication can be performed, such as requesting additional passwords, secret phrases or the like.

While single sign-on authentication is preferred, depending upon the type of access and action the user takes with the IVR agent, additional requests for passwords could also be requested before allowing access to, manipulation, or editing of certain information.

The computer telephony integration module 130 provides computer-telephone integration, as needed, between the IVR agent and one or more of the user 120 and 125. The text-to-speech and automatic speech recognition module 135 can also provide services between the IVR agent 110 and user as desired. For example, and as will be discussed hereinafter, the user has an associated dynamic user profile 145 that allows the user to customize their experience with the IVR agent 110. A non-limiting list of some of the things controllable by the dynamic user profile are language, grammar, modality, preferred endpoint, and in general, any preference relating to interaction with the one or more IVR systems. In addition, the computer telephony integration module 130 will also facilitate the communication between the IVR agent and legacy IVR systems.

The session state module 140 at least provides the ability to save state information in relation to one or more of a synchronous and asynchronous interaction with the one or more IVR systems. As will be discussed hereinafter in greater detail, the session state module 140 allows an IVR session to be paused, and resumed at a later date, as well as an IVR system to be cached, played back to a user with a recording of their selections, and at some point later in time, uploaded to an IVR system.

The IVR agent 110 can comprise one or more software entities that allow one or more of serial and parallel interaction with one or more IVR systems, as well as the necessary TUI, GUI and WUI modules that allow for interaction with user 120 or remote user 125.

The dynamic user profile 145, cooperating with database 150, is capable of storing information such as service numbers for one or more IVRs, personal information, as well as saving information, such as historical information, related to various interactions a user has with one or more of the IVRs. This historical information can be used to automatically and dynamically derive preference information to assist with future streamlining of user-IVR interactions.

The IVR interaction rules module 155 governs such things as dissemination of information to an IVR system, automatic, manual and hybrid responses, and in general controls the exchange of information between the one or more IVRs and the IVR agent 110.

The translation module 160 provides any required translation functionality between any one or more of the IVRs, the IVR agent 110, user 120, and remote user 125. Since all IVRs may not use the same grammar, and the endpoint associated with a user which is used to access the IVR agent 110 may not support the same type of communications protocols, translation module 160 can provide grammar translation, media translation, modality translation, and optionally language translation services.

The rules module 165 cooperates with the dynamic user profile 145 and database 150 to assist the user with managing the preferences in the dynamic user profile 145 as well as controlling such things as how and when to notify a user in the event an asynchronous IVR session has been cached, call handling in the event of the unavailability of one or more of the endpoints associated with the remote user 125, establishing access restrictions to certain pieces of information in the dynamic user profile 145 by the user or an IVR, and in general, can be extended to include any rule that governs any behavior associated with the IVR agent 110.

The auto response module 175 can be used in cooperation with the dynamic user profile 145, database 150, rules module 165 and IVR interaction rules module 155 to automatically respond to one or more queries from an IVR system.

Authentication module 180 provides authentication services to one or more of authenticate a user to the IVR agent 110, authenticate the IVR agent 110 to one or more IVR systems, and authenticate one or more IVR systems, to the IVR agent 110. The dynamic IVR profile 190, in cooperation with the database 195, stores data specific to each IVR. This information can at least include contact information, navigation preferences, grammar preferences, and the like. The information stored in the dynamic IVR profile 190 need not necessarily be user specific, and could be, for example, downloaded from an IVR system upon an initial interaction between the IVR agent 110 and the IVR system. As with the dynamic user profile 145, the IVR profile 190 is dynamic such that it is capable of learning and remembering such things as menu navigation, entered responses, menu hierarchy, and the like, in an effort to assist with streamlining the IVR agent-IVR system interaction.

In operation, and in general, the IVR agent 110 acts on behalf of a user. Through the use of a single sign on authentication, the user only need access the IVR agent in order to be able to interact with any IVR system. This interaction can include an all-user based interaction, automatic interaction with an IVR, or a hybrid in which, for example, the IVR agent 110 responds, for example, by "entering" DTMF digits to respond to IVR queries, in combination with human interaction. For example, upon an initial interaction with an IVR, more human interaction may be required than, for example, the sixth interaction with that same IVR where the dynamic user profile 145, as well as the dynamic IVR profile 190 have "learned" how the user interacts with that particular IVR. The preference information stored in the dynamic user profile 145 can also be used in cooperation with the auto response module 175 to further enhance the users experience by, for example, specifying that the user always would like to select "English" and that the user never wants to participate in a customer service survey, in which case the IVR agent 110 could always respond to that IVR query with a "no" response, or the like.

A user, such as user 120 or remote user 125, begins the session by contacting the IVR agent 110 and authenticates thereto as discussed. The IVR agent 110 provides to the user via one or more of a TUI, GUI and WUI a top-level menu that allows the selection of various actions which are to be performed. These actions can include, for example, checking an inbound cached IVR session, initiating an outbound IVR session and editing a profile. If the user would like to initiate an outbound IVR session, another menu can be provided that allows that the user to select the company, and therefore the corresponding IVR, with which they would like to communicate. The IVR agent 110, in cooperation with the dynamic user profile 145 and database 150, retrieves the appropriate service number for contacting the IVR associated with the requested company and initiates the IVR session. The IVR agent 110, upon commencement of the IVR session, can determine whether the profile for that particular IVR should be retrieved, and for example, stored in the dynamic IVR profile 190 and associated database 195, determine if any translations are required between the IVR, and the IVR agent 110, apply rules from one or more of the IVR interaction rules module 155 and rules module 165 as well as apply any user preferences stored in database 150 to customize the IVR experience for the user.

As discussed, if this is the user's first interaction with a particular IVR system, more user interaction may be required than, for example, a later interaction with the same IVR system. Nevertheless, the IVR agent 110 may be capable of answering certain queries posed by the IVR system. For example, language preferences, personal information, such as account number, name, telephone number associated with an account, and the like, could be automatically handled by the IVR agent, provided the information is available in database 150. As is to be appreciated, and as will be discussed later hereinafter, the user may need to input certain types of information and store this information in the database 150. This information can of course be updated, edited, supplemented or deleted as necessary and the IVR agent 110 can provide to the user an appropriate interface to allow the manipulation of the data in database 150. For example, the administration of this information can be via one or more of a GUI, TUI and/or WUI.

If the IVR agent 110 is able to automatically respond to one or more queries from the IVR system, the IVR agent 110, with the assistance of the dynamic user profile 145, database 150, and applying any rules from the rules module 165 and in cooperation with the auto response module 175 can respond to certain queries. In addition to such things as personal information, additional information, and in general any information in the database 150 could be automatically provided in a response from the IVR agent 110 to an IVR system.

If, for example, the IVR agent 110 determines that an appropriate answer is not available in the database 150, the IVR agent 110 could request the IVR system to "hold," and can query the user to input the requested piece of information. The user could then interface directly with the IVR system via the IVR agent 110 with the entered information optionally being stored in the database 150. Once the requested information is obtained, the interaction with the IVR system could resume with the transmission of the obtained, and requested information.

Optionally, or in addition, a user can pause an interaction with one or more of the IVR systems with the cooperation of the session state module 140. The session state module 140 is capable of saving all relevant information that would allow the subsequent resuming of the IVR session at a later point in time. Furthermore, the session state module 140, in cooperation with the processor 170 and memory 185, could be used to record and archive a session with an IVR system. This may be useful in instances where a user would like to track types of information exchanged between the IVR system and the IVR agent 110, and can also be used as a way of preserving communications with a company.

If the user selects an inbound cached IVR session, this asynchronous interaction begins with the presumption that an IVR session has been cached. For the caching of a session, and based on one or more of a user request, IVR system request, or IVR agent request, the necessary authentications are performed and once appropriately authenticated, caching of the IVR session commences. Specifically, any one or more of the actions discussed above can be performed between the IVR agent 110 and the IVR system.

These types of asynchronous interactions can be used, for example, in the event that the user is unavailable, to assist with reducing IVR system demand during peak hours, could be used during an initial IVR session appreciating that it may take longer for a user to interact with an IVR system the first time than a later time when preference information and answers to specific questions have been stored, and the like.

As the IVR interaction is being cached, the session state module 140 records all necessary information to allow playback of the IVR session to the user as well as the ability to, once the user has entered their response(s), provide the response information back to the IVR system. Once the IVR interaction has been completed, the IVR session is stored in memory 185 where it resides until the user selects the saved session. As discussed, this saved session is replayed to the user in cooperation with the session state module 140, processor 170, memory 185 and can be controlled by one or more of preference information in the dynamic user profile 145, IVR interaction rules module 155 and rules module 165.

Assuming no real-time IVR interaction is required, the user's responses to the queries from the IVR system are stored for uploading back to the IVR at a later date and time.

Optionally, and for example, in the event a user requires additional assistance with a particular question, or has a specific query that is not covered by the cached IVR session information, a real-time IVR interaction can be triggered to assist with resolving of that particular issue. In conjunction with, or upon the conclusion of that session, the other information that was entered by the user and saved could be uploaded to the IVR system. As with all the IVR interactions discussed herein, the various interactions can be archived and stored in a database. The IVR agent 110 could also optionally include a playback module that would allow for the replay of one or more saved sessions.

If the user were to select the editing option in the top level menu, the user would be allowed to one or more of enter, edit and modify information in the database 150, as well as to enter, edit, modify and create preference information as well as rules that are stored in the rules module 165 and the IVR interaction rules module 155. Upon completion of the entering or editing of these various portions of information, the updates can be saved and used for future IVR interactions.

The IVR agent 110 is also capable of dynamic behavior to accommodate for changes in modality. For example, if the user 120 initiates an IVR interaction via a web-based user interface, the user may desire to switch to a TUI-type of interface in that they need to leave for work and the interaction is taking longer than expected. The user 120 can indicate to the IVR agent 110 that they are switching from the web-based user interface to a TUI user interface and can specify, for example, the phone they will be using to perform that interaction. The IVR agent 110 can then transition the IVR interaction to the phone without dropping the IVR session. The user could then be allowed to continue the IVR session by responding via the TUI.

In conjunction with this transition, the IVR agent 110, in cooperation with the translation module 160, can perform any necessary translations that allow the interchangeability of a session over one or more of SMS, voice, DTMF, email, a GUI, a TUI, a WUI, and in general any modality. Furthermore, translation module 160 provides any necessary translation to and from the user, another user device, the IVR agent, and the IVRs. Examples of this translation include not only grammar and media translations, but also text-to-speech, speech-to-text, automatic speech recognition, computer telephony integration, and the like.

Figure 2:
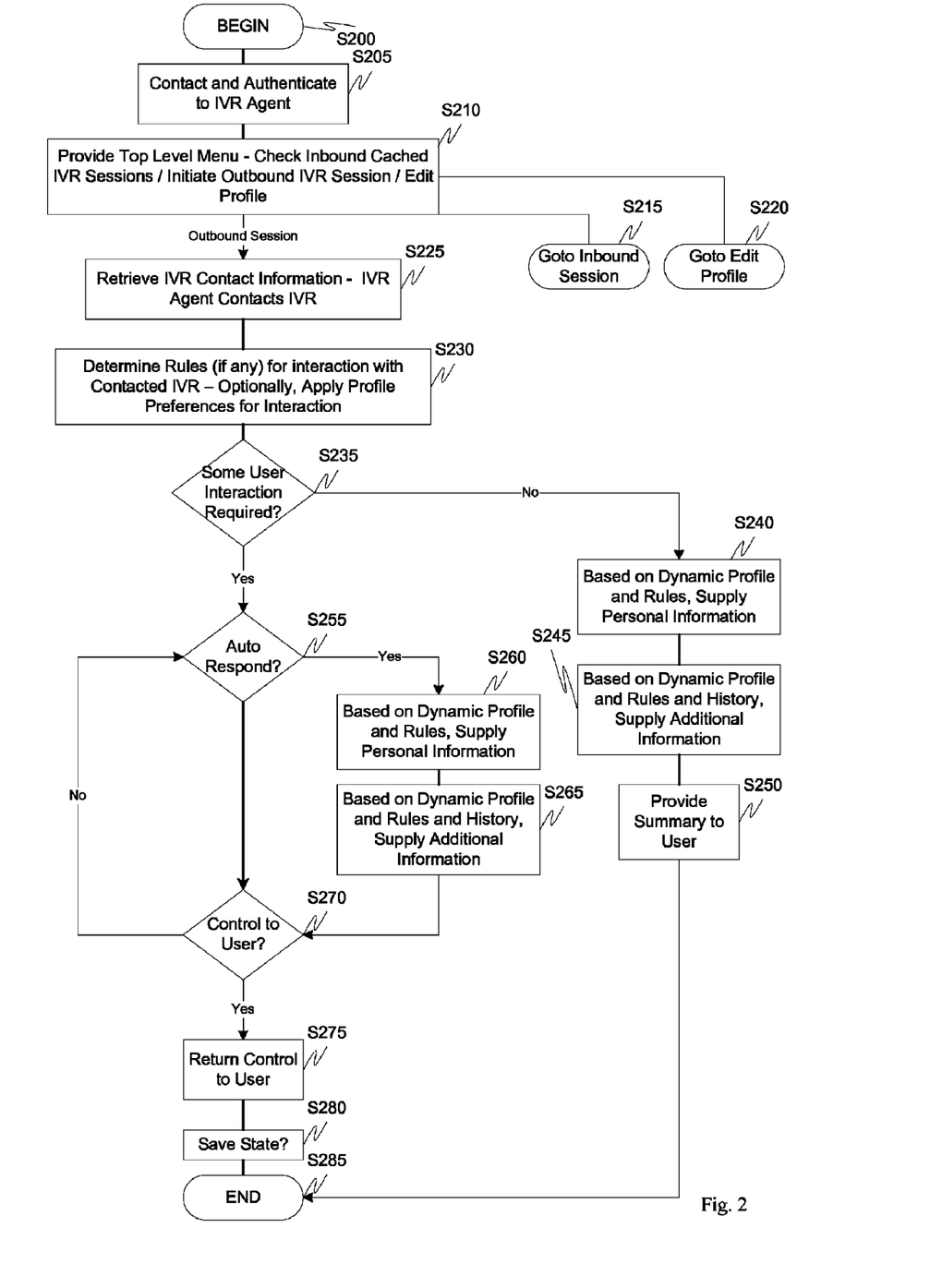
FIG. 2 is a flowchart outlining the exemplary method of operation for an IVR agent according to this invention.

FIG. 2 illustrates an exemplary method of utilizing an IVR agent according to an exemplary embodiment of this invention. In particular, control begins in step S200 and continues to step S205. In step S205, a user contacts and authenticates to the IVR agent. As discussed, this authentication can be a single sign on authentication thereby eliminating a need for the user to further authenticate to any contacted IVR systems. Next, in step S210, a top level menu is provided to the user that allows, for example, selection of accessing an inbound cached IVR session, initiation of an outbound IVR session, and editing of, for example, profile information, rules information and preferences. If the user elects to initiate an outbound IVR session, control continues to step S225. Otherwise, if the user elects to check an inbound cached IVR session, control jumps to step S215. If the user elects to edit information, control jumps to step S220.

In step S225, and for the initiation of an outbound IVR session, the contact information for the desired IVR system is retrieved with the IVR agent commencing contacting the selected IVR system. Next, in step S230, a determination is made whether any rules apply to the interaction with the selected IVR and optionally profile preferences for the interaction applied to the interaction. Furthermore, and as appropriate, translation can also occur between one or more of a user, an IVR agent, and the IVR system to allow intercommunicability between the three. Then, in step S235, a determination is made whether some user interaction is required. If user interaction is required, control continues to step S255. Otherwise, control jumps to step S240.

In step S240, and based on the user's dynamic profile and rules, personal information can be supplied from the IVR agent to the IVR system on behalf of the user. As discussed, this supplying of information can be fully automated with the IVR agent appropriately responding to queries forwarded by the IVR system. The information may come from a database or may be entered by the user. Next, in step S245, and again based on the dynamic profile, rules, and history, additional information above and beyond the personal information can be provided by the IVR agent automatically back to the IVR system. Then, in step S250, an optional summary can be provided to the user with control continuing to step S285 where the control sequence ends.

If some user interaction is required, control continues to step S255 where a determination is made whether the system is able to automatically respond to an asked question. If the system is able to automatically respond, control continues to step S260 where based on the user's dynamic profile and rules, personal information can be provided to the IVR system. Then, in step S265, additional information can be provided again in conjunction with the user's dynamic profile rules and history. Control then continues to step S270.

In step S270, a determination is made whether control should be returned to the user. For example, if in step S255 it is determined that the system cannot automatically respond on behalf of the user, some user interaction may be required. The system can automatically continue through this process with some questions being answered by the IVR agent on behalf of the user and some questions being answered by the user directly, until the IVR system has been navigated. More specifically, if control should return to the user, control continues to step S275 where the user can continue interaction with the IVR until the completion of the IVR session. Then, in step S280, the session can optionally be saved with state information, or archived. For example, in step S280, if the user has not completed the totality of the IVR interaction, state information as well as historical information that led the user to the particular state they are in in the IVR interaction can be saved and restored at a later date and time.

In addition, the session can be archived for historical purposes. Control then continues to step S285 where the control sequence ends. The user may also be transferred to an agent or a person, such as a call center agent or customer service representative, in which case the IVR agent could drop out for that portion of the communication.

Figure 3:
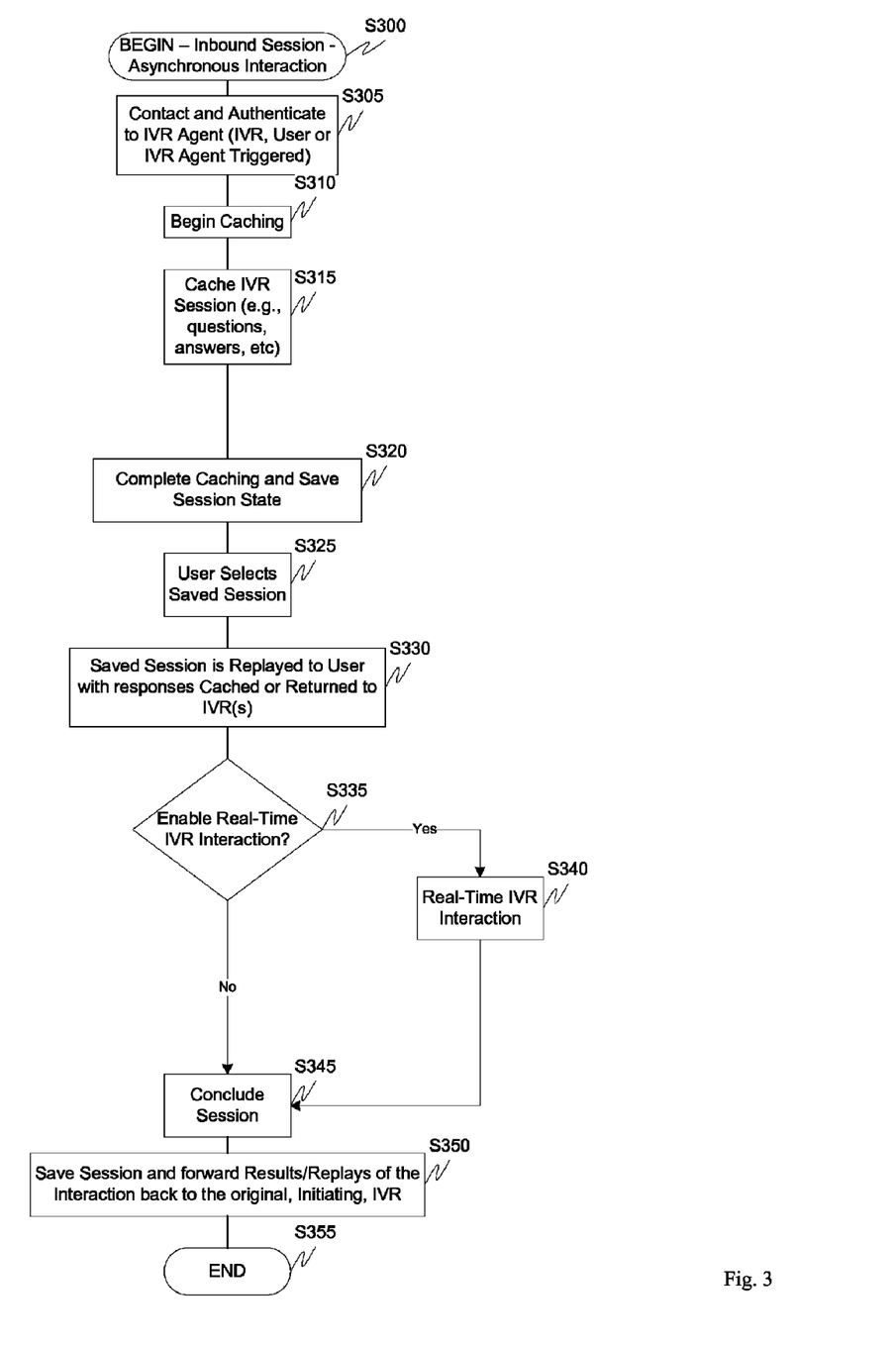
FIG. 3 is a flowchart outlining an exemplary method for asynchronous interaction according to this invention.

FIG. 3 illustrates an exemplary embodiment for conducting an inbound interactive session, such as asynchronous interaction where an IVR session is cached for the user. This session could be performed completely automatically, without user interaction, or, as shown, with user interaction. In particular, control begins in step S300 and continues to step S305. In step S305, an IVR agent and an IVR commence communications and necessary authentication procedures. This communication can be triggered by the IVR, by a user, or by an IVR agent. Next, in step S310, caching of the IVR session commences. Then, in step S315, the IVR session is cached. This can include caching of questions asked by an IVR system, as well as recording of any automated answers an IVR agent may supply during the caching system. This process continues until a portion of the IVR session has been cached. Control then continues to step S320.

In step S320, the caching is completed and saved along with appropriate session state information. This cached sessions can be stored for any amount of time. Then, at some point later in time, in step S325, a user elects to interact with the saved session. Then, in step S330, the saved session is replayed to the user with the user's responses cached for later uploading back to the IVR system. During playback of the saved session, answers automatically inserted by the IVR agent can also be played to the user, with the option of the user being allowed to modify the automatically answered responses. Control then continues to step S335.

In step S335, a determination is made whether real-time IVR interaction is required. If it is required, control jumps to step S340, with control otherwise continuing to step S345.

In step S340, real-time IVR interaction commences including, for example, some of the steps outlined in relation to FIG. 2. Control then continues to step S345.

In step S345, the session is concluded with control continuing to step S350 where the session can be saved. Furthermore, results and responses from the IVR session can be returned back to the original, initiating IVR. This return of the responses can be on the same communications channel as, for example, the real-time IVR interaction, or it can be on a different communications channel, such as via the Internet. Control then continues to step S355 where the control sequence ends.

Figure 4:
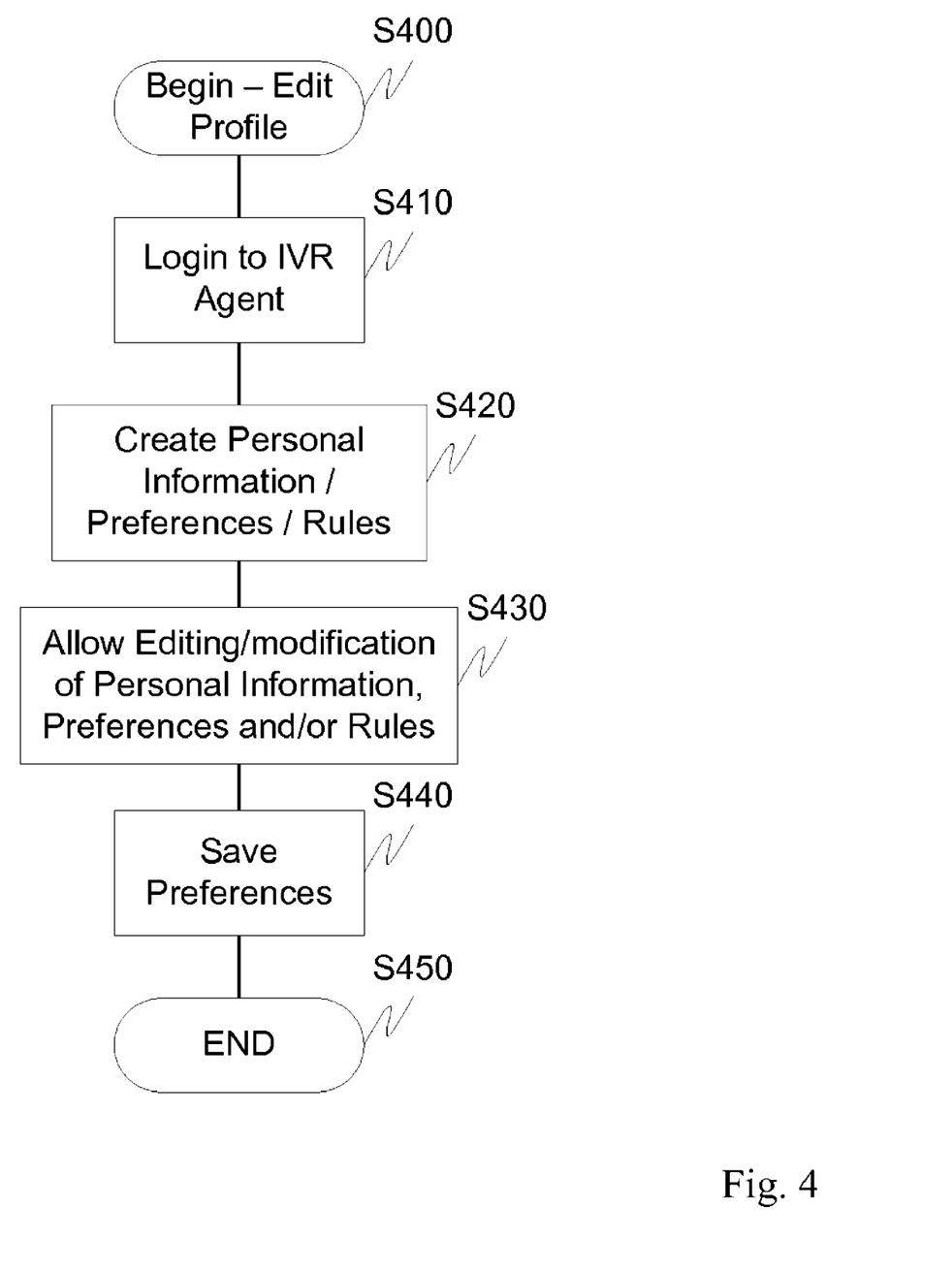
FIG. 4 outlines an exemplary method for updating, creating and maintaining one or more of personal information, preferences and rules according to this invention.

FIG. 4 outlines an exemplary method for editing information associated with the IVR agent according to an exemplary embodiment of this invention. In particular, control begins in step S400 and continues to step S410. In step S410, a user logs onto the IVR agent. Next, in step S420, a user can be provided with an appropriate interface, e.g., TUI, GUI, and/or WUI, to allow creation or entering of personal information, preferences and rules.

Then, in step S430, an interface can be provided that allows editing or modification of the personal information, preferences and/or rules. Upon completion of any necessary creation or editing of the above information, control continues to step S440 where the preferences are saved with control continuing to step S450 where the control sequence ends.

Figure 5:
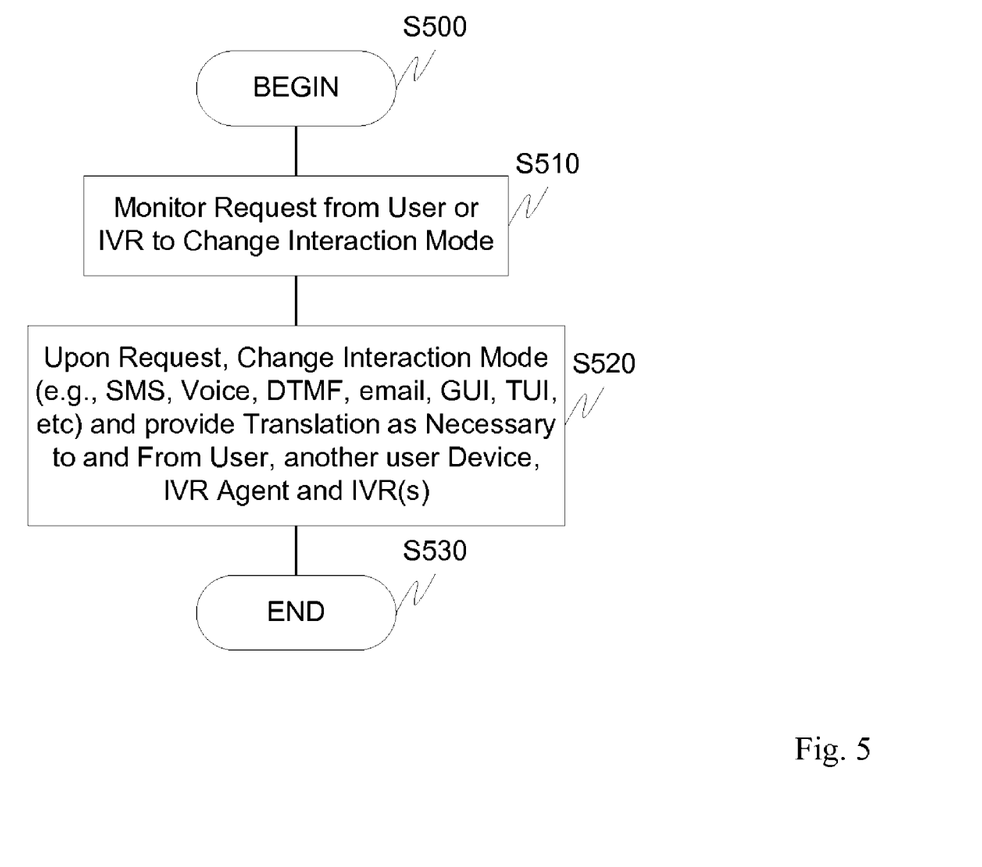
FIG. 5 is a flowchart outlining an exemplary method for translation according to this invention.

FIG. 5 outlines an exemplary method for changing an interaction mode according to this invention. In particular, control begins in step S500 and continues to step S510. In step S510, a request from one or more of a user, IVR system, and IVR agent triggers a necessity to change the interaction mode. Next, in step S520, the interaction mode is changed and any necessary translations provided so as to allow further communication between one or more of the user, another user device, the IVR agent and one or more IVR systems. As discussed, the change interaction mode can be from one to another of SMS, voice, TTMF, email, GUI, TUI, WUI, or the like. Control then continues to step S530 where the control sequence ends.

A number of variations and modifications of the invention can be used. It would be possible to provide or claims for some features of the invention without providing or claiming others.

The exemplary systems and methods of this invention have been described in relation to enhancing IVRs. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method of interfacing with one or more interactive voice response systems using an interactive voice response (IVR) agent comprising:
   providing a single sign on authentication to the IVR agent, wherein a user authenticates once to a brokering service and is able to proceed with performing multiple IVR interactions with completely independent IVR systems without having to re-authenticate to each IVR system; and
   providing one or more IVR sessions, wherein the IVR sessions are customized by one or more of a dynamic user profile, a dynamic IVR profile and rules.

2. The method of claim 1, further comprising providing translation services between one or more of a user, the IVR agent and an interactive voice response system.

3. The method of claim 1, further comprising receiving information from an interactive voice response system specifying one or more of contact information, navigation preferences and grammar preferences.

4. The method of claim 1, wherein the IVR agent is adapted to respond automatically on a user's behalf.

5. The method of claim 1, wherein communication types and protocols used between the IVR agent, the interactive voice response systems and a user can be any combination of speech, web-based communications, telephone-based communications, graphical user interface-based communications, command line, IP protocol, scripting, configuration file and DTMF communications.

6. The method of claim 1, wherein a session can be cached for asynchronous interaction.

7. The method of claim 1, wherein the one or more IVR sessions can be managed by the IVR agent in a serial or parallel fashion.

8. The method of claim 1, wherein the IVR agent provides one or more of a TUI, GUI and WUI to a user.

9. The method of claim 1, further comprising modifying an IVR session in accordance with user preferences.

10. The method of claim 1, wherein the brokering service automatically navigates and interacts with all, or portions, of existing IVR menu systems on behalf of the user.

11. A non-transitory computer-readable storage media having stored thereon information that, when executed by a processor, performs the steps of claim 1.

12. A system that interfaces with one or more interactive voice response systems using an IVR agent comprising:
   an authentication module that provides a single sign on authentication to the IVR agent, wherein a user authenticates once to a brokering service and is able to proceed with performing multiple IVR interactions with completely independent IVR systems without having to re-authenticate to each IVR system; and the IVR agent providing one or more IVR sessions to the user, wherein the IVR sessions are customized by one or more of a dynamic user profile, a dynamic IVR profile and rules.

13. The system of claim 12, further comprising a translation module that provides translation services between one or more of the user, the IVR agent and an interactive voice response system.

14. The system of claim 12, wherein the dynamic IVR profile receives information from an interactive voice response system specifying one or more of contact information, navigation preferences and grammar preferences.

15. The system of claim 12, wherein the IVR agent is adapted to respond automatically on a user's behalf in cooperation with an auto response module.

16. The system of claim 12, wherein communication types and protocols used between the IVR agent, the interactive voice response system and the user can be any combination of speech, web-based communications, telephone-based communications, graphical user interface-based communications, command line, IP protocol, scripting, configuration file, pipes and DTMF communications.

17. The system of claim 12, wherein a session can be cached for asynchronous interaction.

18. The system of claim 12, wherein the one or more IVR sessions can be managed by the IVR agent in a serial or parallel fashion.

19. The system of claim 12, wherein the IVR agent provides one or more of a TUI, GUI and WUI to a user.

20. The system of claim 12, further comprising a session state module that records state information associated with the one or more IVR sessions.

* * * * *